United States Patent
Singh

(10) Patent No.: US 9,294,789 B2
(45) Date of Patent: Mar. 22, 2016

(54) ENHANCED LIVE MULTIBITRATE VIDEO ENCODING

(75) Inventor: Gajinder Singh, Noida (IN)

(73) Assignee: Adobe Systems Incorporated, San Jose, CA (US)

( * ) Notice: Subject to any disclaimer, the term of this patent is extended or adjusted under 35 U.S.C. 154(b) by 2226 days.

(21) Appl. No.: 12/331,365

(22) Filed: Dec. 9, 2008

(65) Prior Publication Data

US 2013/0195168 A1  Aug. 1, 2013

(51) Int. Cl.
*H04N 21/2365* (2011.01)

(52) U.S. Cl.
CPC ................ *H04N 21/23655* (2013.01)

(58) Field of Classification Search
USPC ............. 375/240.02–240.03, 240.18–240.26
See application file for complete search history.

(56) References Cited

U.S. PATENT DOCUMENTS

| | | | |
|---|---|---|---|
| 6,081,784 A * | 6/2000 | Tsutsui | ............ 704/501 |
| 6,938,047 B2 | 8/2005 | Kryeziu | |
| 7,400,764 B2 | 7/2008 | Kryeziu | |
| 7,496,676 B2 | 2/2009 | Kryeziu | |
| 7,818,444 B2 | 10/2010 | Brueck et al. | |
| 2002/0175995 A1* | 11/2002 | Sleeckx | ............ 348/143 |
| 2005/0122393 A1* | 6/2005 | Cockerton | ............ 348/14.12 |
| 2007/0079327 A1 | 4/2007 | Khoo et al. | |
| 2007/0156679 A1 | 7/2007 | Kretz et al. | |
| 2007/0162487 A1* | 7/2007 | Frailey | ............ 707/102 |
| 2007/0220552 A1 | 9/2007 | Juster et al. | |
| 2007/0226365 A1 | 9/2007 | Hildreth et al. | |
| 2007/0282905 A1 | 12/2007 | Karlberg | |
| 2008/0091838 A1* | 4/2008 | Miceli | ............ 709/231 |
| 2008/0310825 A1 | 12/2008 | Fang et al. | |
| 2009/0063975 A1 | 3/2009 | Bull et al. | |
| 2009/0094248 A1 | 4/2009 | Petersen | |
| 2009/0099919 A1 | 4/2009 | Schultheiss et al. | |
| 2011/0066673 A1 | 3/2011 | Outlaw | |

OTHER PUBLICATIONS

"Move Media Player, Move Networks", http://web.archive.org/web/20080516004150/http://www.movenetworks.com/wp-content/uploads/move-media-player.pdf, May 16, 2008.

"Move Adaptive Stream, Move Network,", web page at http://web.archive.org/web/20081010161808/http://www.movenetworks.com/wp-content/uploads/move-adaptive-stream.pdf, Oct. 10, 2008.

"Move Networks, Move Networks Solutions", web page at http://web.archive.org/web/20080913152314/http://www.movenetworks.com/why-move/solutions, as available via the Internet and printed Apr. 19, 2012.

"Our Clients, Move Networks,", web page at http://web.archive.org/web/20080831021014/http://www.movenetworks.com/why-move/our-clients, as available via the Internet and printed Apr. 19, 2012.

(Continued)

*Primary Examiner* — Benjamin Lanier
(74) *Attorney, Agent, or Firm* — Kilpatrick Townsend & Stockton LLP

(57) ABSTRACT

Multibitrate (MBR) live video broadcasting is disclosed in which live video input is copied into a plurality of streams each designated for encoding into a different bitrate. The MBR broadcasting operation is made efficient by performing pre-quantization calculations only the first of the plurality of streams. The results of those calculations are then merely copied to the other streams. Quantization and encoding processes may then be applied to each of the streams to process the streams into their respective, predetermined bitrates.

25 Claims, 5 Drawing Sheets

(56) References Cited

OTHER PUBLICATIONS

"SWF File Format Specificiation Version 10", web page at http://web.archive.org/web/20081203000338/http://www.adobe.com/devnet/swf/pdf/swf_file_format_spec_v10.pdf, dated Dec. 3, 2008.

"United States Patent and Trademark Office, Office Action", U.S. Appl. No. 12/559,029, mailed Mar. 1, 2011, 11 pages.

"United States Patent and Trademark Office, Office Action", U.S. Appl. No. 12/559,029, mailed Aug. 19, 2011, 8 pages.

Birney, Bill, "Intelligent Streaming", web page at http://www.microsoft.com/windows/windowsmedia/howto/articles/intstreaming.aspx, as available via the Internet and printed Apr. 19, 2012.

* cited by examiner

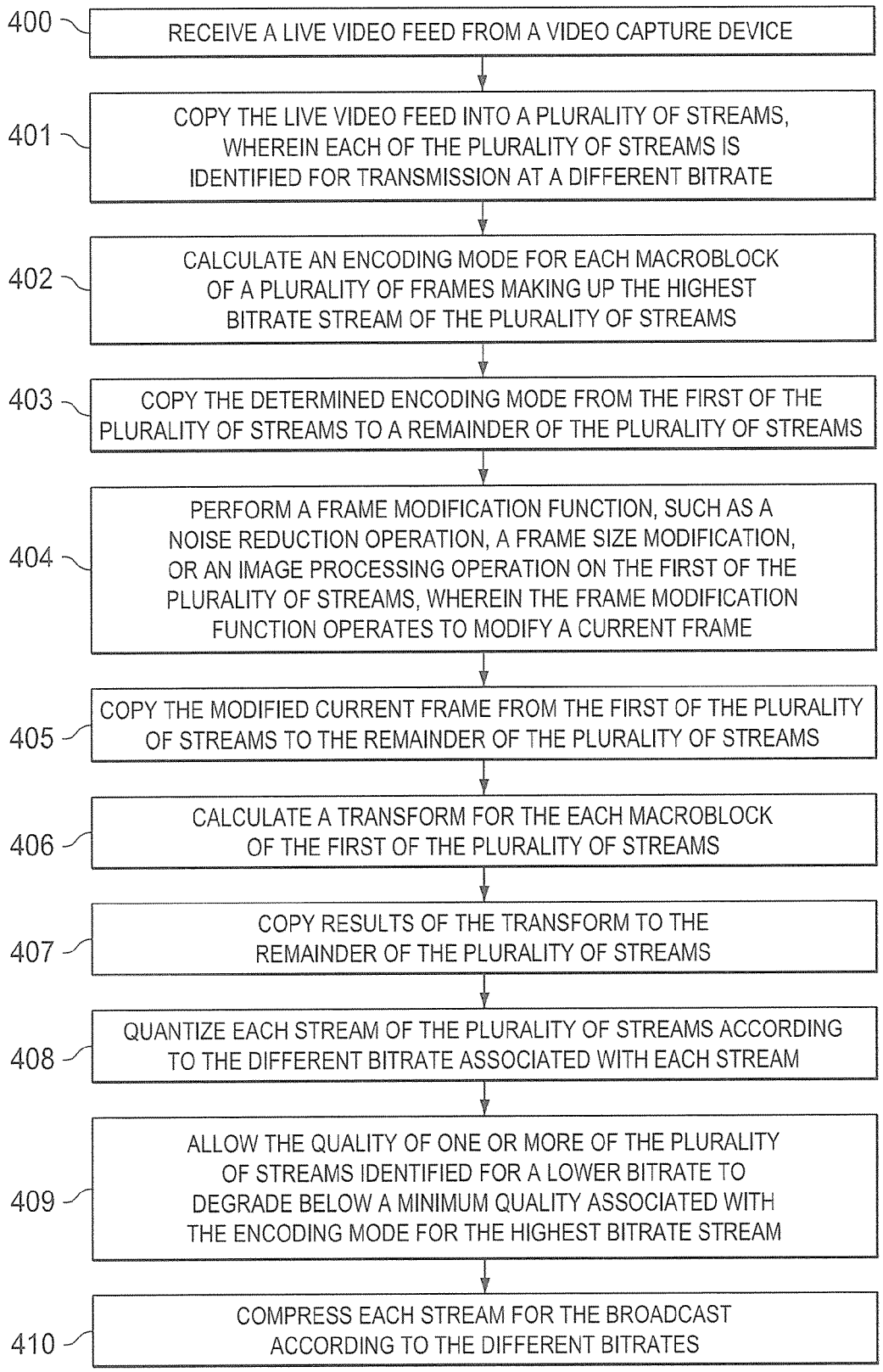

FIG. 4

400 — RECEIVE A LIVE VIDEO FEED FROM A VIDEO CAPTURE DEVICE

401 — COPY THE LIVE VIDEO FEED INTO A PLURALITY OF STREAMS, WHEREIN EACH OF THE PLURALITY OF STREAMS IS IDENTIFIED FOR TRANSMISSION AT A DIFFERENT BITRATE

402 — CALCULATE AN ENCODING MODE FOR EACH MACROBLOCK OF A PLURALITY OF FRAMES MAKING UP THE HIGHEST BITRATE STREAM OF THE PLURALITY OF STREAMS

403 — COPY THE DETERMINED ENCODING MODE FROM THE FIRST OF THE PLURALITY OF STREAMS TO A REMAINDER OF THE PLURALITY OF STREAMS

404 — PERFORM A FRAME MODIFICATION FUNCTION, SUCH AS A NOISE REDUCTION OPERATION, A FRAME SIZE MODIFICATION, OR AN IMAGE PROCESSING OPERATION ON THE FIRST OF THE PLURALITY OF STREAMS, WHEREIN THE FRAME MODIFICATION FUNCTION OPERATES TO MODIFY A CURRENT FRAME

405 — COPY THE MODIFIED CURRENT FRAME FROM THE FIRST OF THE PLURALITY OF STREAMS TO THE REMAINDER OF THE PLURALITY OF STREAMS

406 — CALCULATE A TRANSFORM FOR THE EACH MACROBLOCK OF THE FIRST OF THE PLURALITY OF STREAMS

407 — COPY RESULTS OF THE TRANSFORM TO THE REMAINDER OF THE PLURALITY OF STREAMS

408 — QUANTIZE EACH STREAM OF THE PLURALITY OF STREAMS ACCORDING TO THE DIFFERENT BITRATE ASSOCIATED WITH EACH STREAM

409 — ALLOW THE QUALITY OF ONE OR MORE OF THE PLURALITY OF STREAMS IDENTIFIED FOR A LOWER BITRATE TO DEGRADE BELOW A MINIMUM QUALITY ASSOCIATED WITH THE ENCODING MODE FOR THE HIGHEST BITRATE STREAM

410 — COMPRESS EACH STREAM FOR THE BROADCAST ACCORDING TO THE DIFFERENT BITRATES

ENHANCED LIVE MULTIBITRATE VIDEO ENCODING

CROSS-REFERENCE TO RELATED APPLICATIONS

The present application is related to co-pending, and commonly assigned U.S. patent application Ser. No. 12/201,952 entitled DYNAMICALLY ALTERING PLAYLISTS, the disclosure of which is hereby incorporated herein by reference.

TECHNICAL FIELD

The present disclosure relates, in general, to streaming media, and, more particularly, to enhanced live multibitrate (MBR) video encoding.

BACKGROUND

As networking technology and bandwidth capabilities have increased, the delivery of richer multimedia resources has also increased and improved in quality and accessibility. Internet services such as Google Inc.'s YOUTUBE™ allow individuals to access video content that has been stored to remote servers. Services are also available that provide web seminars, called "webinars", in which live or recorded multimedia or video content is broadcast to participants who register or request to receive the streaming data. Live video broadcasting, in particular, provides numerous challenges to ensure that users receive a reliable and cognizable representation of the live content.

In general, streaming live video content entails a number of steps to process the raw, image data into the compressed/encoded format to be transmitted to the recipient. Raw video data captured by a video recorder is typically input into a computer-based signal processing system for encoding into the resulting format and bitrate. The raw video data generally comes into the system divided into a series of frames. Each frame represents a snap shot of the live content based on the recording or sampling rate of the recording equipment, which is typically given in frames per second (fps). The encoding system may determine various frames to drop from the stream in order to meet a certain bitrate or quality requirement. Furthermore, a variety of different filtering or computational processes may be applied to the frames to reduce noise or change the resulting size of the frames.

In the encoding process, each frame is broken down into multiple macroblocks, which are blocks of pixels measuring 8 pixels-by-8 pixels. The macroblocks are then analyzed and assigned a particular mode based on the relative content between the macroblock and a previous macroblock. In order to conserve bandwidth, macroblocks can be encoded either as intra-mode blocks, in which all of the video information in the block is preserved and encoded, or as inter-mode blocks, in which only the video information representing the difference or delta from another macroblock is encoded. This process is similar to the animation process in which key frames include all of the information for the scene and subsequent frames until the next key frame only include the stepped changes from the key frame. Assigning macroblock modes generally entails comparing the current macroblock with one or more previous macroblocks and analyzing any changes that occur in any of the elements in the image data. Based on the level of movement or change in such elements, the encoding system will determine whether the current macroblock should be an intramode block or an intermode block.

Depending on the particular encoding scheme, there are various different types of macroblock modes. However, in general, those various types can still be broken into mode that do not depend on any other macroblock, i.e., intramode blocks, and nodes that depend on other blocks in order to calculate a difference or other such relationship, i.e., intermode blocks.

Once the appropriate mode is assigned to a macroblock, the macroblock image data is processed or transformed into the frequency domain by applying a Fourier-related transform to it. Typically, a discrete cosine transform (dct), which is a type of Fourier transform, is used in signal compression. The image processing is performed on all of the image data in intramode macroblocks and on the delta information in intermode blocks. After processing the image data using the transform, the result is typically divided by the quantization value. The quantization value is a measure of the detail that is desired to represent the sampled continuous signal data in the digital signal. The quantization value will determine how many bits will be used to represent that signal, and, thus, is related to the quality and the bitrate of the desired data stream. Therefore, the specific quantization value used will be determined based on the bitrate and quality intended. The result of quantizing the transformed signal data generally results in 64 coefficients. These coefficients, of which all or a subset may be used depending on the bitrate, are then used to encode or compress the macroblocks. Each macroblock of each frame of the live streaming video goes through this computationally intensive process.

Presentation of video or multimedia content is not generally limited to only those users having a particular bandwidth or bitrate availability. Video may be delivered over various bitrates according to the bitrate that the user has access to or desires to use. Thus, it is common practice to provide live video broadcasts in multiple bitrates (MBRs). When the user requests access to the live broadcast, he or she will select a desired bitrate to use. In general services that are providing the live video broadcast generate the encoded streams in the various bitrates that are offered to users so that the user simply selects the desired bitrate after which the broadcasting system directs the video stream associated with that bitrate to the user.

These services offering MBR live video broadcasting perform each of the computationally intensive processes on each stream intended for the different bitrates. Therefore, there is a large computational and processing requirement for providing such MBR live video broadcasting services. These computational and processing requirements may limit the number of services that may be capable of providing such MBR broadcasts.

BRIEF SUMMARY

The embodiments presented in this disclosure are directed to systems, methods, and computer program products that process live video streams for MBR live video broadcasting. At least a first and second of streams are generated from the live video stream, each such stream designated for encoding into a different bitrate. The teachings herein provide efficient operation of MBR broadcasting by performing pre-quantization calculations only the first of the streams. The results of those calculations are then applied to the other streams. Quantization and encoding processes may then be applied to each of the streams to process the streams into their respective predetermined bitrates.

Representative embodiments of the present teaching are directed to methods that include receiving a live video feed to be broadcast at a plurality of bitrates, wherein the live video feed comprises a plurality of frames and wherein each of the plurality of frames comprises a plurality of macroblocks. The methods further include generating at least first and second streams from the live video feed, wherein each of the streams is identified for transmission at a different bitrate from each other, calculating an encoding mode for each macroblock making up the first stream, applying the calculated encoding mode from the first stream to the second stream, image processing image data on each macroblock of the first stream using a Fourier-related transform, applying results of the image processing to the second stream, quantizing each of the streams according to the different bitrates identified for the each stream, and compressing each of the streams for broadcast according to the identified different bitrates.

Additional representative embodiments of the present disclosure are directed to computer implemented systems that include a processor, memory coupled to the processor, a multibitrate (MBR) live video broadcasting application stored in the memory, and a network interface configured to broadcast the encoded video streams at the predetermined bitrates. When executed by the processor, the MBR live video broadcasting application includes an input interface configured to receive raw video input, a stream separation component configured to copy a plurality of frames of the raw video input into a plurality of video streams, wherein the plurality of frames is made up of a plurality of macroblocks. Each of the video streams is designated for a different predetermined bitrate from the other video streams. The computer implemented systems also include a macroblock mode component configured to calculate a mode of a current macroblock from a first video stream, a mode copy component configured to copy the calculated mode to the remaining video streams, and an encoding component configured to encode each of the video steams according to their associated predetermined bitrates.

Still further embodiments of the present teaching are directed to computer program products having a computer readable medium with computer program logic recorded thereon. The computer program product includes code for receiving a live video feed to be broadcast at a plurality of bitrates, wherein the live video feed comprises a plurality of frames and wherein each of the plurality of frames comprises a plurality of macroblocks. The computer program products also include code for generating at least first and second streams from the live video feed, wherein each of the first and second streams is identified for transmission at a different bitrate from each other, code for calculating an encoding mode for each macroblock of the plurality of macroblocks making up the first stream, code for applying the calculated encoding mode from the first stream to the second stream, code for image processing image data on each macroblock of the first stream using a Fourier-related transform, code for applying results of the image processing to the second stream, code for quantizing each of the first and second streams according to the identified different bitrates for the each stream, and code for compressing each of the first and second streams for broadcast according to the identified different bitrate.

The foregoing has outlined rather broadly the features and technical advantages of the present invention in order that the detailed description that follows may be better understood. Additional features and advantages will be described hereinafter which form the subject of the claims. It should be appreciated by those skilled in the art that the conception and specific embodiment disclosed may be readily utilized as a basis for modifying or designing other structures for carrying out the same purposes of the present teaching. It should also be realized by those skilled in the art that such equivalent constructions do not depart from the spirit and scope of the disclosure as set forth in the appended claims. The novel features which are believed to be characteristic of the teaching herein, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present teaching.

BRIEF DESCRIPTION OF THE DRAWINGS

For a more complete understanding of the present teaching, reference is now made to the following descriptions taken in conjunction with the accompanying drawing, in which:

FIG. 4 is a flowchart illustrating example steps executed to implement another embodiment of the present teachings.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter. Some portions of the detailed description which follow are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art.

An algorithm is here, and generally, considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like, refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

Figure 1:
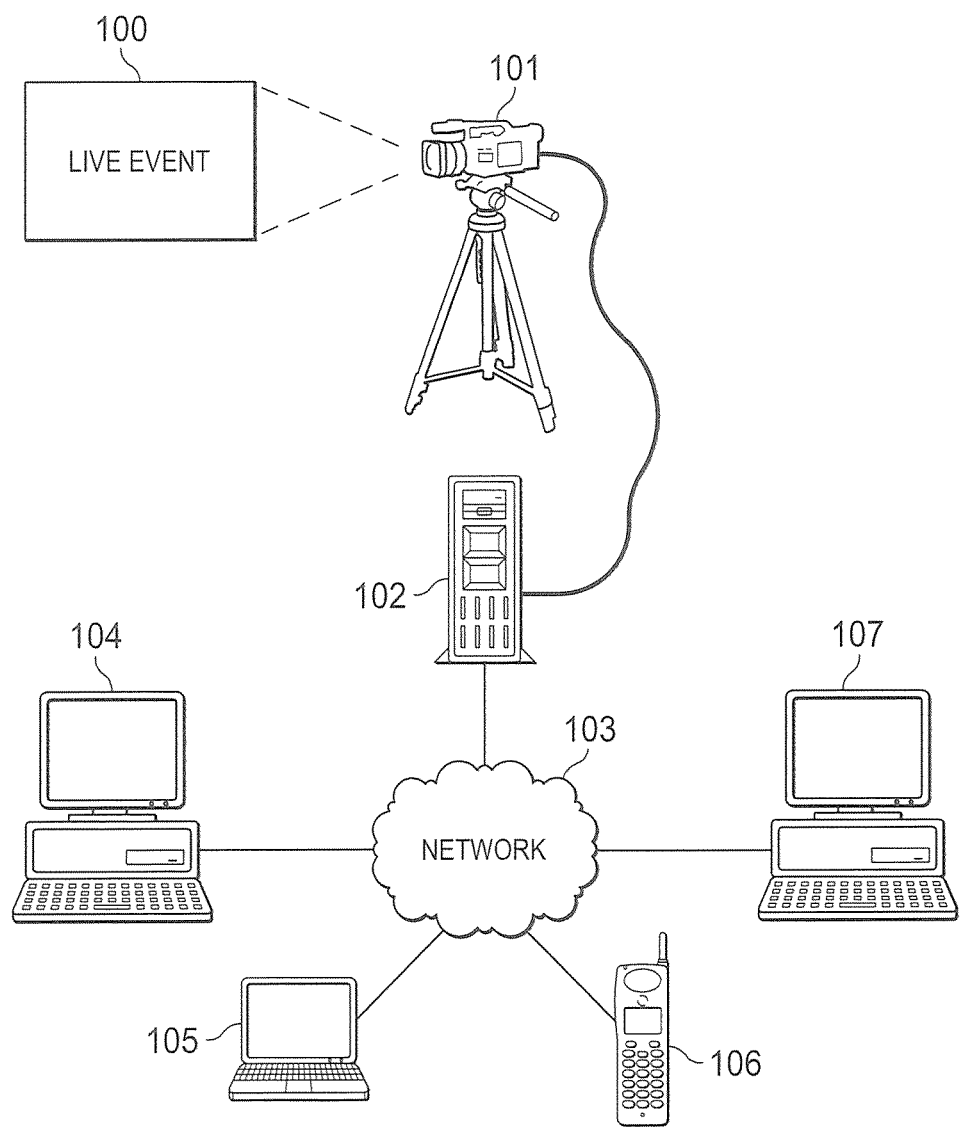
FIG. 1 is a diagram illustrating an MBR live video broadcasting system.

FIG. 1 is a diagram illustrating MBR live video broadcasting system 10. Live event 100 is being recorded by video camera 101. Video camera 101 is coupled to broadcast server 102, which is configured according to one embodiment of the teachings herein. Broadcast server 102 is coupled to network 103, which may be any various network, such as a wide area network (WAN), local area network (LAN), or network such as the Internet. Video system 10 is configured to offer MBR broadcasting of live event 100. Video system 10 offers broadcast streams in 300 kilobits per second (Kbps), 600 Kbps, 1000 Kbps, and 1500 Kbps.

Users wishing to view the live broadcast connect, in some fashion, to network 103. Once connected to network 103 the users access broadcast server 102, request access to the live broadcast of live event 100, select the appropriate bitrate, and then begin receiving the broadcast material. For the sake of clarity of the described embodiment, the user devices connecting to network 103 will be referred to as users 104-107. In operation, users 104-107 comprise users at their respective devices using those devices to access network 103.

It should be noted that various users desiring to view the live broadcast may connect to network 113 in a number of different ways. For example, mobile phone users may connect to network 103 using a wireless telecommunication network. Other users may connect to network 103 using a short range wireless technology, such as Institute of Electrical and Electronics Engineers (IEEE) 802.11, or the like. Still other users may connect through wired networks, LANs, WANs, and the like.

User's 104 and 107, through desktop computers, connect to network 103 via LAN and select the 1500 Kbps bitrate to receive the live video feed of live event 100. User 105, through a notebook computer, connects to network 103 via a IEEE 802.11g connection and selects the 1000 Kbps bitrate to receive the live video feed. User 106, through a mobile phone, connects to network 103 via a mobile telecommunications network and selects the 300 Kbps bitrate to receive the live video feed.

Broadcast server 102 provides its MBR video streams without performing all computations and processes on each of the available video streams. Instead, prior to quantization, the calculations and computations are performed of one of the streams and then the results of the computations are merely applied to the other streams. In this manner, the amount of computations are drastically reduced while still providing the same number of streams.

Figure 2:
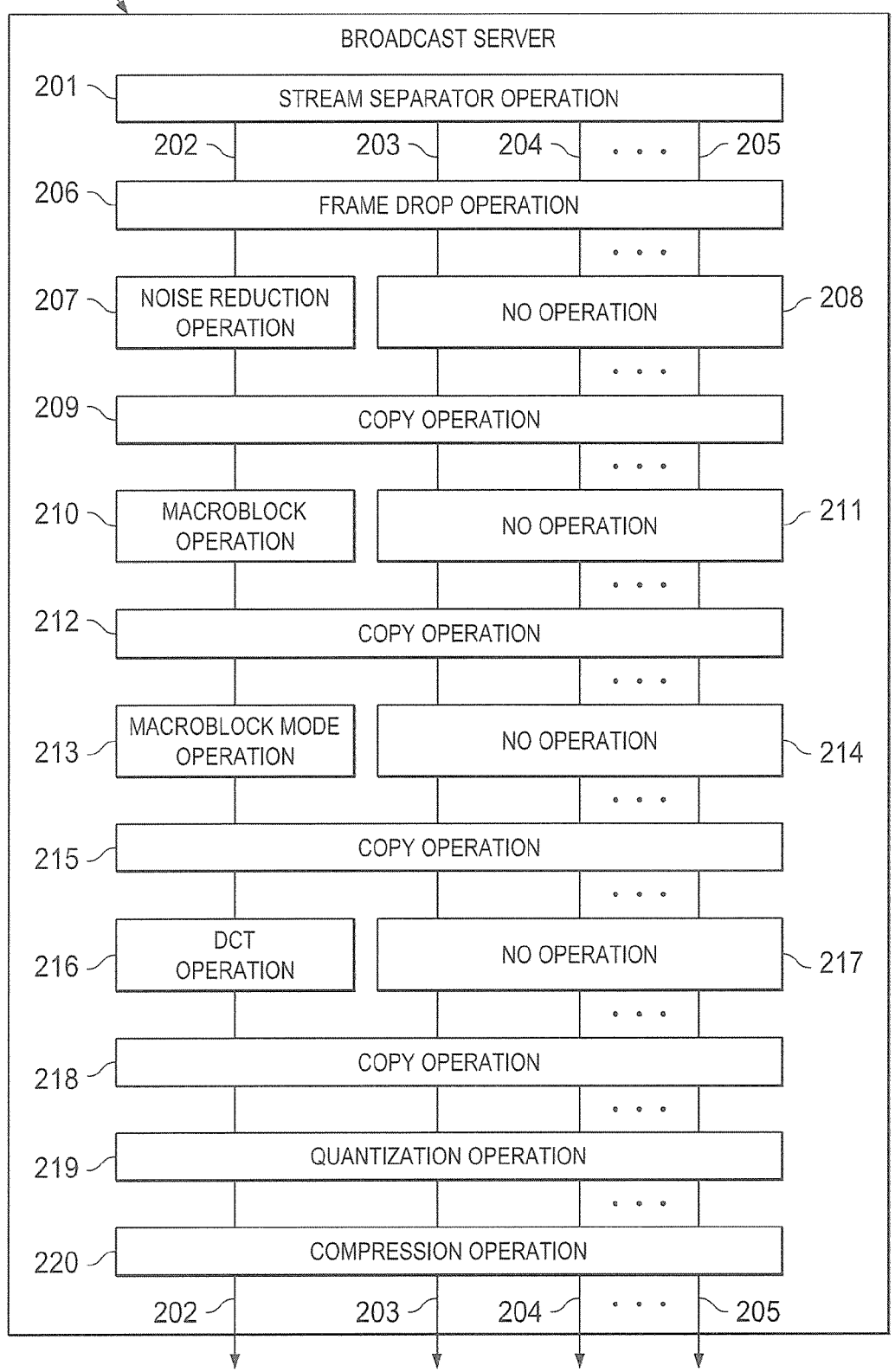
FIG. 2 is an operational chart illustrating operations performed by a broadcast server as configured according to one embodiment of the present teachings.

FIG. 2 is an operational chart illustrating operations performed by broadcast server 20 as configured according to one embodiment of the present teachings. Input frame 200 enters broadcast server 20 for preparation of each bitrate stream. Broadcast server 20 maintains separate processes for managing operations on the various streams that will be produced. Various code components are stored on broadcast server 20 for implementing operations of broadcasting live video content. Stream separator operation 201 creates stream structures 202-205 by copying input frame 200 into separate stream structures 202-205. The copies of input frame 200 maintain the size of input frame 200 for each of streams 202-205. Stream structures 202-205 examine their respective frames and make a determination whether or not to drop the frame from the stream in frame drop operation 206. The decision of whether to drop is made by a majority of separate processes managing streams 202-205. The decision may be based on bitrate limitations, frame delay, or the like.

Noise reduction operation 207 performs noise reducing filter calculations on stream 202. Block 208 indicates that while noise reduction operation 207 operates on stream 202, no operations are being performed on streams 203-205. As the results of the filter calculations are obtained from noise reduction operation 207, those results are simply copied from stream 202 onto streams 203-205 in copy operation 209. While copy operation 209 uses processor time in performing the copying operations, the copying operations performed are not as computationally intensive as the filtering calculations of noise reduction operation 207.

The frame in stream 202 is divided into macroblocks at macroblock operation 210. Block 211 indicates that while macroblock operation 210 operates on stream 202, no operations are being performed on streams 203-205. The determined macroblocks are then copied over to streams 203-205 in copy operation 212. Macroblock mode operation 213 next analyzes the macroblocks in stream 202 comparing the current macroblocks against previous macroblocks in stream 202 in order to determine whether the macroblocks should be intermode macroblocks or intramode macroblocks. Block 214 indicates that while macroblock mode operation 213 operates on stream 202, no operations are being performed on streams 203-205. After each of the macroblock modes are determined for stream 202, they are copied over to streams 203-205 in copy operation 215. Again, the computational intensity of copying the results from stream 202 onto streams 203-205 is far less than performing the comparisons and analysis for determining the macroblock mode for each of streams 203-205.

Dct operation 216 performs a discrete cosine transformation (dct) on the image data of the macroblocks of stream 202. For each intramode block of stream 202, the dct is performed on all of the image data making up the macroblock of the frame. When intermode blocks are encountered, the dct processes only the image data representing the difference or delta between the represented macroblock and one or more of the chronologically previous macroblocks in stream 202. Block 217 indicates that while dct operation 216 operates on the macroblocks of stream 202, no operations are being performed on streams 203-205. The results of the dct are then copied from stream 202 onto streams 203-205 at copy operation 218.

Quantization operation 219 performs quantization on each of streams 202-205. A quantization value is selected based on the desired bitrate of the stream. Thus, at quantization operation 219, the quantizing calculations are performed on each of streams 202-205. The selected quantization value divides the dct of the macroblocks resulting in a number of coefficients. The resulting coefficients are then used in compression operation 220 to arithmetically compress each of streams 202-205 according to their associated bitrates. Once compression of streams 202-205 is complete, streams 202-205 are broadcast to a network through network interface 221. Because far fewer computations and calculations were performed in broadcast server 20, the preparation of MBR live video streams occurs much more efficiently than if those calculations were performed on all of the bitrate streams offered by broadcast server 20.

Figure 3:
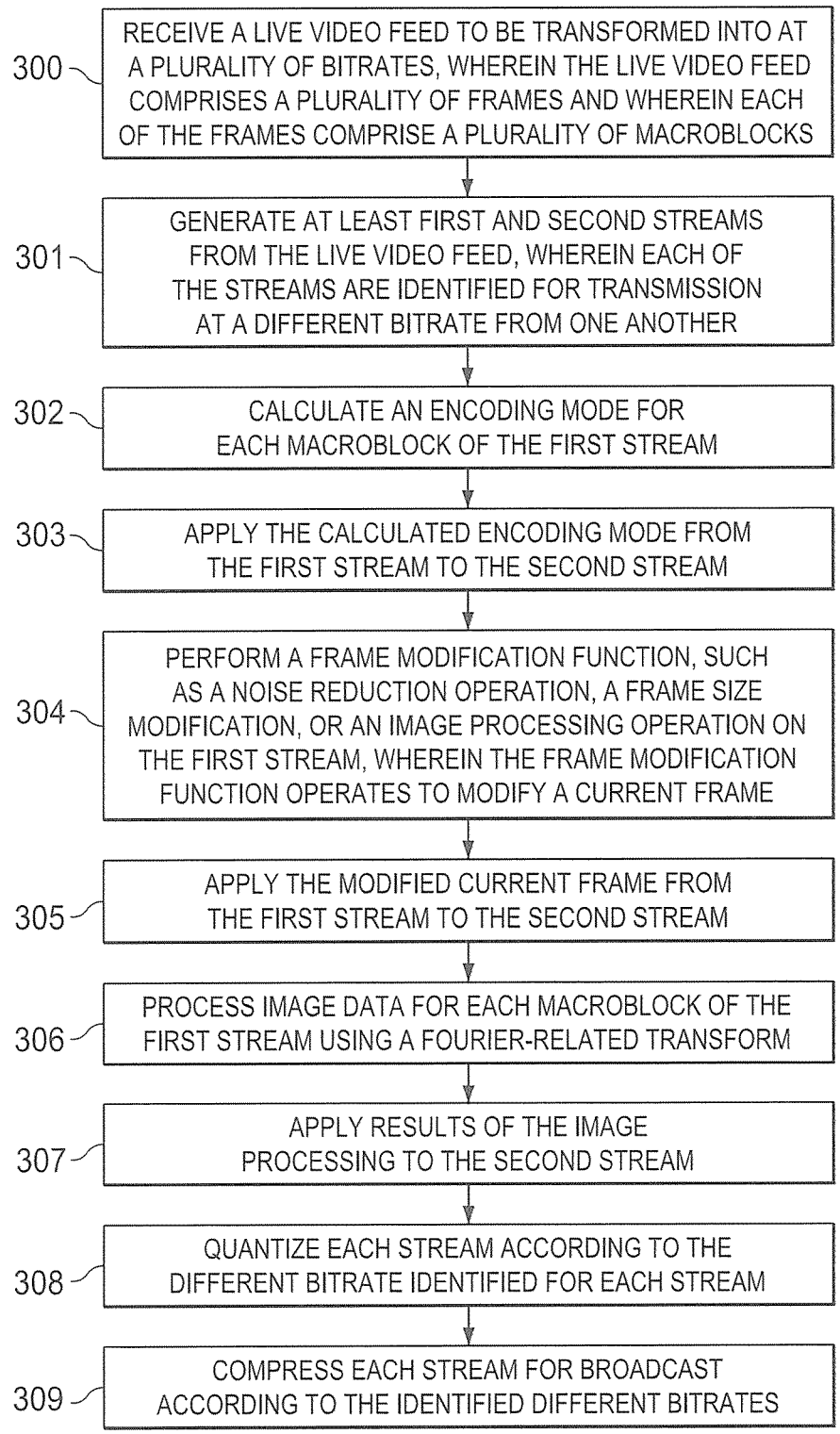
FIG. 3 is a flowchart illustrating example steps executed to implement one embodiment of the present teaching.

It should be noted that, prior to quantization, various other types of operation calculations may be performed on the macroblocks of one of the streams FIG. 3 is a flowchart illustrating example steps executed to implement one embodiment of the present teaching. In step 300, a live video feed is received for broadcasting at a plurality of bitrates, wherein the live video feed comprises a plurality of frames and wherein each of the plurality of frames comprises a plurality of macroblocks. At least first and second streams are generated, in step 301, from the live video feed, wherein each of the first and second streams is identified for transmission at a different bitrate from each other. An encoding mode is calculated, in step 302, for each macroblock of the plurality of macroblocks making up the first stream. The calculated encoding mode is applied, in step 303, from the first stream to the second stream. Image data is processed, in step 304, on each macroblock of the first stream using a Fourier-related transform. The image processing results are then applied to the second stream in step 305. Each of the streams is quantized, in step 306, according to the different bitrates identified for the each stream. Each of the first and second streams is compressed for broadcast, in step 307, according to the identified different bitrates.

It should be noted that in some encoding and compression systems, the standard of the system prevents the quality level of the encoded/compressed stream to fall below a certain, designated minimum level. In such systems, the system would prevent the quality level of a stream encoded for a higher level to drop to a quality that is standard for another lower bitrate stream. Embodiments of the present teachings provide specific allowances for this quality degradation to occur in order to gain in the efficiency of performing the majority of the computationally intensive calculations on only one of a number of live video streams in an MBR system.

FIG. 4 is a flowchart illustrating example steps executed to implement another embodiment of the present teachings. In step 400, a live video feed is received from a video capture device. The live video feed is copied, in step 401, into a plurality of streams, wherein each of the plurality of streams is identified for transmission at a different bitrate. An encoding mode is calculated, in step 402, for each macroblock of a plurality of frames making up the highest bitrate stream of the plurality of streams. The determined encoding mode is copied, in step 403, from the first of the plurality of streams to a remainder of the plurality of streams. In step 404, a frame modification function, such as a noise reduction operation, a frame size modification, or an image processing operation is performed on the first of the plurality of streams, wherein the frame modification function operates to modify a current frame. The modified current frame is copied from the first of the plurality of streams, in step 405, to the remainder of the plurality of streams. Image processing is performed using a Fourier-related transform on the image data of each macroblock of the first of the plurality of streams in step 406. The results of the image processing are copied to the remainder of the plurality of streams in step 407. Each stream of the plurality of streams is quantized, in step 408, according to the different bitrate associated with the each stream. In step 409, the quality of one or more of the plurality of streams identified for a lower bitrate is allowed to degrade below a minimum quality associated with the encoding mode for the highest bitrate stream. Each stream is them compressed for broadcast, in step 410, according to the different bitrates.

Embodiments, or portions thereof, may be embodied in program or code segments operable upon a processor-based system (e.g., computer system) for performing functions and operations as described herein. The program or code segments making up the various embodiments may be stored in a computer-readable medium, which may comprise any suitable medium for temporarily or permanently storing such code. Examples of the computer-readable medium include such tangible computer-readable media as an electronic memory circuit, a semiconductor memory device, random access memory (RAM), read only memory (ROM), erasable ROM (EROM), flash memory, a magnetic storage device (e.g., floppy diskette), optical storage device (e.g., compact disk (CD), digital versatile disk (DVD), etc.), a hard disk, and the like.

Embodiments, or portions thereof, may be embodied in a computer data signal, which may be in any suitable form for communication over a transmission medium such that it is readable for execution by a functional device (e.g., processor) for performing the operations described herein. The computer data signal may include any signal that can propagate over a transmission medium such as electronic network channels, optical fibers, air, electromagnetic media, radio frequency (RF) links, and the like, and thus the data signal may be in the form of an electrical signal, optical signal, radio frequency or other wireless communication signal, etc. The code segments may, in certain embodiments, be downloaded via computer networks such as the Internet, an intranet, a local area network (LAN), a metropolitan area network (MAN), a wide area network (WAN), the public switched telephone network (PSTN), a satellite communication system, a cable transmission system, and/or the like.

Figure 5:
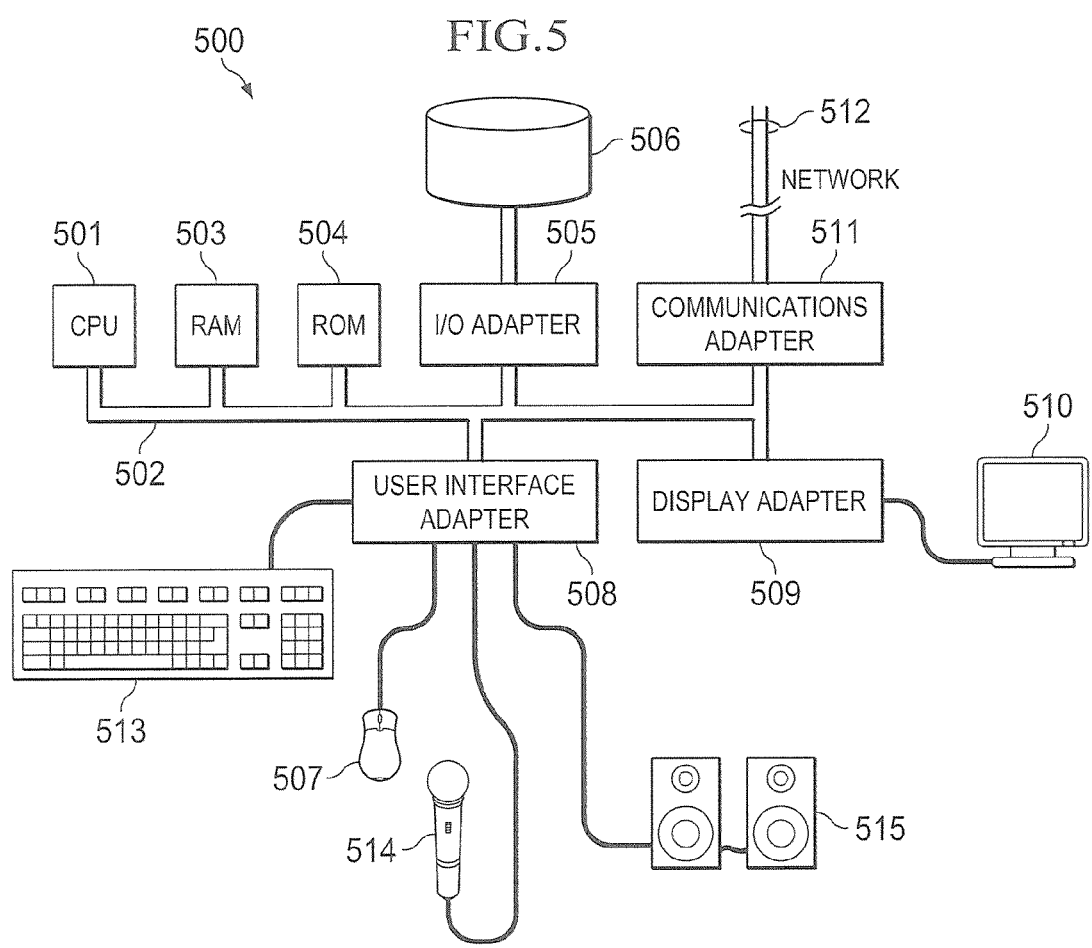
FIG. 5 illustrates an exemplary computer system which may be employed to implement the broadcast servers and operations therein according to certain embodiments.

FIG. 5 illustrates an exemplary computer system 500 which may be employed to implement the broadcast servers and operations therein according to certain embodiments. Central processing unit (CPU) 501 is coupled to system bus 502. CPU 501 may be any general-purpose CPU. The present disclosure is not restricted by the architecture of CPU 501 (or other components of exemplary system 500) as long as CPU 501 (and other components of system 500) supports the inventive operations as described herein. CPU 501 may execute the various logical instructions described herein. For example, CPU 501 may execute machine-level instructions according to the exemplary operational flow described above in conjunction with FIGS. 3 and 4. When executing instructions representative of the operational steps illustrated in FIGS. 3 and 4, CPU 501 becomes a special-purpose processor of a special purpose computing platform configured specifically to operate according to the various embodiments of the teachings described herein.

Computer system 500 also includes random access memory (RAM) 503, which may be SRAM, DRAM, SDRAM, or the like. Computer system 500 includes read-only memory (ROM) 504 which may be PROM, EPROM, EEPROM, or the like. RAM 503 and ROM 504 hold user and system data and programs, as is well known in the art.

Computer system 500 also includes input/output (I/O) adapter 505, communications adapter 511, user interface adapter 508, and display adapter 509. I/O adapter 505, user interface adapter 508, and/or communications adapter 511 may, in certain embodiments, enable a user to interact with computer system 500 in order to input information.

I/O adapter 505 connects to storage device(s) 506, such as one or more of hard drive, compact disc (CD) drive, floppy disk drive, tape drive, etc., to computer system 500. The storage devices are utilized in addition to RAM 503 for the memory requirements associated performing the operations, copying and compressing the frame macroblocks. Communications adapter 511 is adapted to couple computer system 500 to network 512, which may enable information to be input to and/or output from system 500 via such network 512 (e.g., the Internet or other wide-area network, a local-area network, a public or private switched telephony network, a wireless network, any combination of the foregoing). User interface adapter 508 couples user input devices, such as keyboard 513, pointing device 507, and microphone 514 and/or output devices, such as speaker(s) 515 to computer system 500. Display adapter 509 is driven by CPU 501 to control the display on display device 510 to, for example, for setting up the various MBR to offer for broadcast. Display adapter 509 transmits instructions for transforming or manipulating the state of the various numbers of pixels used by display device 510 to visually present the desired information to a user. Such instructions include instructions for changing state from on to off, setting a particular color, intensity, duration, or the like. Each such instruction makes up the rendering instructions that control how and what is displayed on display device 510.

It shall be appreciated that the present disclosure is not limited to the architecture of system 500. For example, any suitable processor-based device may be utilized for implementing the MBR live video broadcast system, including without limitation personal computers, laptop computers, computer workstations, multi-processor servers, and even mobile telephones. Moreover, certain embodiments may be implemented on application specific integrated circuits (ASICs) or very large scale integrated (VLSI) circuits. In fact, persons of ordinary skill in the art may utilize any number of suitable structures capable of executing logical operations according to the embodiments.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method comprising:
   receiving a live video feed to be transformed into a plurality of bitrates, wherein said live video feed comprises a plurality of frames and wherein each of said plurality of frames comprises a plurality of macroblocks;
   generating at least first and second streams from said live video feed, wherein each of said first and second streams is identified for transmission at a different bitrate from each other;
   calculating an encoding mode for each macroblock of said plurality of macroblocks making up said first stream;
   applying said calculated encoding mode from said first stream to said second stream;
   image processing image data on said each macroblock of said first stream using a Fourier-related transform;
   applying results of said image processing to said second stream;
   quantizing each of said first and second streams according to said different bitrates identified for said each stream; and
   compressing each of said first and second streams for broadcast according to said identified different bitrates.

2. The method of claim 1 wherein said Fourier-related transform comprises a discrete cosine transform.

3. The method of claim 1 wherein said encoding mode comprises one of:
   an intermode block; or
   an intramode block.

4. The method of claim 3 wherein said image processing said image data comprises one of:
   image processing said image data on said intermode block, wherein said intermode block comprises a delta between a current macroblock and one or more previous macroblocks in said plurality of frames; or
   image processing said image data on said intramode block, wherein said intramode block comprises all image data contained within said current macroblock.

5. The method of claim 1 further comprising:
   receiving an indication from first and second stream processes, said indication representing a determination of whether to drop a current frame of said plurality of frames, wherein said first and second stream processes manages a corresponding one of said first and second streams; and
   responsive to receiving said indication from a majority of said first and second stream processes, dropping said current frame from said first and second streams.

6. The method of claim 1 further comprising:
   performing a frame modification function on said first stream, wherein said frame modification function operates to modify a current frame; and
   applying said modified current frame from said first stream to said second stream.

7. The method of claim 6 wherein said frame modification function comprises one or more of:
   a noise reduction operation;
   a frame size modification; and
   an image processing operation.

8. The method of claim 1 wherein said calculating said encoding mode comprises:
   calculating a high encoding mode for a highest bitrate of said different bitrate, wherein a quality of one said first and second streams identified for a lower bitrate is allowed to degrade below a minimum quality associated with said high encoding mode.

9. A computer implemented system comprising:
   a processor;
   memory coupled to said processor;
   a multibitrate (MBR) live video broadcasting application stored in said memory, wherein, when executed by said processor, said MBR live video broadcasting application on said processor comprises:
      an input interface configured to receive raw video input;
      a stream separation component configured to copy a plurality of frames of said raw video input into a plurality of video streams, wherein each of said plurality of frames comprises a plurality of macroblocks and wherein each of said video streams is designated for a predetermined bitrate;
      a macroblock mode component configured to calculate a mode of each of said plurality of macroblocks of a first of said plurality of video streams;
      a mode copy component configured to copy said calculated mode to remaining ones of said plurality of video streams; and
      an encoding component configured to encode each of said plurality of video steams according to said designated predetermined bitrate; and
   a network interface configured to broadcast each of said plurality of encoded video streams at said designated predetermined bitrate.

10. The computer implemented system of claim 9 wherein execution of said MBR live video broadcasting application further comprises:
- a transform component configured to process image data of said current macroblock from said first of said plurality of video streams using a Fourier-related transform; and
- a transform copy component configured to copy said processed image data to said remaining ones of said plurality of video streams.

11. The computer implemented system of claim 10 wherein said encoding component comprises:
- a quantization component configured to quantize said processed image data for each of said plurality of video streams according to said predetermined bitrate corresponding to each of said plurality of video streams; and
- a compression component configured to arithmetically compress each of said plurality of video streams according to said corresponding predetermined bitrate.

12. The computer implemented system of claim 10 wherein said Fourier-related transform comprises a discrete cosine transform.

13. The computer implemented system of claim 9, wherein execution of said MBR live video broadcasting application further comprises:
- a frame modification operation configured to modify image data content of said current macroblock of said first of said plurality of streams; and
- a frame modification copy operation configured to copy said modified image data to remaining ones of said plurality of streams.

14. The computer implemented system of claim 13 wherein said frame modification operation comprises one or more of:
- a noise reduction operation;
- a frame size modification operation; and
- an image processing operation.

15. The computer implemented system of claim 9, wherein execution of said MBR live video broadcasting application further comprises:
- a frame drop operation configured to receive an indication from a plurality of stream processes, said indication representing a determination of whether to drop a current frame of said plurality of frames, wherein each of said plurality of stream processes manages a corresponding one of said plurality of streams, and wherein said current frame is dropped responsive to receiving said indication from a majority of said plurality of stream processes.

16. A non-transitory computer readable media comprising program code, the program code comprising:
- code for receiving a live video feed to be transformed into a plurality of bitrates, wherein said live video feed comprises a plurality of frames and wherein each of said plurality of frames comprises a plurality of macroblocks;
- code for generating at least first and second streams from said live video feed, wherein each of said first and second streams is identified for transmission at a different bitrate from each other;
- code for calculating an encoding mode for each macroblock of said plurality of macroblocks making up said first stream;
- code for applying said calculated encoding mode from said first stream to said second stream code for image processing image data on said each macroblock of said first stream using a Fourier-related transform;
- code for applying results of said image processing to said second stream;
- code for quantizing each of said first and second streams according to said different bitrate identified for said each stream; and
- code for compressing each of said first and second streams for broadcast according to said identified different bitrate.

17. The non-transitory computer readable media of claim 16 wherein said Fourier-related transform comprises a discrete cosine transform.

18. The non-transitory computer readable media of claim 16 wherein said encoding mode comprises one of:
- an intermode block; or
- an intramode block.

19. The non-transitory computer readable media of claim 18 wherein said code for image processing said image data comprises one of:
- code for image processing said image data on said intermode block, wherein said intermode block comprises a delta between a current macroblock and one or more previous macroblocks in said plurality of frames; or
- code for image processing said image data on said intramode block, wherein said intramode block comprises all image data contained within said current macroblock.

20. The non-transitory computer readable media of claim 16 further comprising:
- code for receiving an indication from first and second stream processes, said indication representing a determination of whether to drop a current frame of said plurality of frames, wherein each of said first and second stream processes manages a corresponding one of said first and second streams; and
- responsive to receiving said indication from a majority of said first and second stream processes, code for dropping said current frame from said first and second streams.

21. The non-transitory computer readable media of claim 11 further comprising:
- code for performing a frame modification function on said first stream, wherein said frame modification function operates to modify a current frame; and
- code for applying said modified current frame from said first stream to said second stream.

22. The non-transitory computer readable media of claim 21 wherein said frame modification function comprises one or more of:
- a noise reduction operation;
- a frame size modification; and
- an image processing operation.

23. The non-transitory computer readable media of claim 16 wherein said code for calculating said encoding mode comprises:
- code for calculating a high encoding mode for a highest bitrate of said different bitrate, wherein a quality of one or more of said first and second streams identified for a lower bitrate is allowed to degrade below a minimum quality associated with said high encoding mode.

24. A method comprising:
- receiving a binary digital electronic signal representing an uncompressed live video feed, the live video feed comprising a plurality of frames and wherein each of said plurality of frames comprises a plural of macroblocks;
- executing instructions on a computing platform so that binary digital electronic signals representing a first video stream and a second video stream are generated based on the uncompressed video stream, the first video stream for encoding at a first bitrate and the second video stream for encoding at a second bitrate;

executing instructions on said computing platform so that an encoding mode is calculated for each macroblock of said plurality of macroblocks of said first video stream, said encoding mode being thereafter applied from said first stream to said second stream;

executing instructions on said computing platform so that image data on each macroblock of said first stream is processed using a Fourier-related transform, said results of said image processing being applied to said second stream;

executing instructions on said computing platform so that the first video stream is quantized according to the first bitrate and the second stream is quantized according to the second bitrate;

executing instructions on said computing platform so that the first video stream is encoded according to the first bitrate and the second video stream is encoded according to the second bitrate; and storing the resulting binary digital electronic signals representing the first video stream encoded at the first bitrate and the second video stream encoded at the second bitrate in a memory location of said computing platform for later use.

25. A method comprising:

receiving a video comprising a plurality of frames, each frame comprising a plurality of macroblocks;

generating a first stream from the video by at least calculating an encoding mode for each of the plurality of macroblocks and image processing image data on each of the plurality of macroblocks using a Fourier-related transform, wherein the generated first stream corresponds to a first bitrate; and generating a second stream from the video by at least applying the calculated encoding mode for each macroblock from the first stream to the second stream and applying the image processing from the first stream to the second stream, wherein the generated second stream corresponds to a second bitrate, the second bitrate lower than the first bitrate.

* * * * *